United States Patent
Wang et al.

(10) Patent No.: US 7,334,770 B2
(45) Date of Patent: Feb. 26, 2008

(54) SOLENOID ISOLATION VALVE

(76) Inventors: Wei-ching Wang, 1791 Branchwood Park, Mississauga (CA) L4W 2E5; Chia-Ping Wang, 1791 Branchwood Park, Mississauga (CA) L4W 2E5; Yu-ching Wang, 1791 Branchwood Park, Mississauga (CA) L4W 2E5

( * ) Notice: Subject to any disclaimer, the term of this patent is extended or adjusted under 35 U.S.C. 154(b) by 0 days.

(21) Appl. No.: 11/161,914

(22) Filed: Aug. 22, 2005

(65) Prior Publication Data

US 2007/0039591 A1   Feb. 22, 2007

(51) Int. Cl.
*F16K 31/12* (2006.01)
*F02M 59/36* (2006.01)

(52) U.S. Cl. ............... 251/30.01; 251/29; 123/458; 123/527

(58) Field of Classification Search ......... 123/458, 123/527; 251/30.01, 30.02, 30.03, 30.04, 251/33, 38, 29
See application file for complete search history.

(56) References Cited

U.S. PATENT DOCUMENTS

| | | | | |
|---|---|---|---|---|
| 4,494,726 A | * | 1/1985 | Kumar et al. ............. | 251/29 |
| 4,699,351 A | * | 10/1987 | Wells ..................... | 251/29 |
| 5,294,089 A | * | 3/1994 | LaMarca ................ | 251/30.02 |
| 5,762,087 A | * | 6/1998 | Khadim .................. | 137/1 |
| 6,315,266 B1 | * | 11/2001 | Hirota et al. ............ | 251/30.01 |
| 6,540,204 B1 | * | 4/2003 | Carter .................... | 251/30.01 |

* cited by examiner

*Primary Examiner*—Carl S. Miller
(74) *Attorney, Agent, or Firm*—Steven H. Leach; Ridout & Maybee LLP

(57) ABSTRACT

An improved pilot-operated, "instant-on", solenoid isolation valve discloses a new fluid passage route to save cost of drilling a longitudinal hole within the primary piston. Also, a new feature of primary piston assembly with a movable seal piston having a specific circumferential surface matching to valve body chamber to restrict fluid from front side into back side of the primary piston to produce pressure difference to induce instant valve open when solenoid is energized initially. It also introduces a channel hole in the flange of the sleeve assembly as a communication channel of supply of gas into the chambers of the back side of primary piston assembly. The diameter of the channel hole is not critical to determine in this new invent. As long as the size of the hole is smaller than that of the bleed hole, it can maintain pressure difference between the front side and back side of primary piston during valve opening operation. In addition, since the pilot piston and the primary piston assembly operate independently, the travel stroke of the primary piston assembly is unconstrained by the input electrical power.

8 Claims, 3 Drawing Sheets

SOLENOID ISOLATION VALVE

FIELD OF THE INVENTION

The primary application field of the invention relates to fuel systems for compressed natural gas (CNG) vehicles or the like. It may be use for other applications, such as high pressure gas filling station.

BACKGROUND OF THE INVENTION

When compressed natural gas or compressed hydrogen gas is stored in cylinders at pressure as high as 6,000 psig, without equipped a fuel pump, an electrical solenoid is used to control fuel flow to quickly start and stop the fueling process. There exist some problems in the current electrically operated pilot-type, "instant-on" solenoid valves, especially during the opening and closing stage of the valve. In the prior arts U.S. Pat. No. 5,762,087 and No. 6,540,204; a ring segregates the primary piston to form a front side and a back side, where the front side is in the direction of the outlet. When the solenoid is energized, a pressure difference is created between the front side and the back side and it overcomes the biasing elements to open the solenoid valve. During the opening process, a small ratio of the amount of gas of inlet to outlet of the back side of the primary piston is desired, because it helps to open the valve. However, in this case, such ratio is rather critical and it can not be easily determined. During the valve close procedure, as the pilot piston is trying to adjust itself to a seal position, the amount of gas leaking from the back side of the primary piston to the outlet of the valve may be higher than that of supplying from the front side. Hence, the pressure won't be able to build up in the back side. Under this circumstance, because the spring force can not overcome the pressure difference between the back side and the front side of the primary piston, the valve might not close eventually.

In this invention, two matching surfaces between the primary piston assembly and valve body chamber is designed in such a way that the gas flow is restrained from the front side to back side of the primary piston assembly to create a pressure difference when the solenoid energizes, so that the valve open instantly. A channel hole is introduced to maintain the pressure difference between the front side and the back side of the primary piston assembly while when the valve opens. Unlike the prior arts, during the closing process and when the pilot piston adjusts itself to a seal position, the amount of gas entering the back side of the primary piston assembly is faster than the amount of gas leaking and that since a certain pressure difference is maintained, the valve can be closed quickly. In either case, the ratio of the amount of gas is not critical.

Another feature disclosed in the present invention is that an axial center column mounting in the housing of the valve provides a bleed hole seat and an axial passage being in communication fluid with the outlet chamber. The magnetic field generated by the permissible electrical power of the solenoid will determine the maximum travel stroke of the pilot piston. In this invention, since the pilot piston does not sit on the primary piston assembly, the stroke of the primary piston is not limited under such permissible condition.

SUMMARY OF THE INVENTION

Accordingly, it is an object of the present invention to provide a solenoid isolation valve of the above mentioned general type which avoids the disadvantages of the prior art.

It is also an object of the present invention to provide a solenoid isolation valve that will virtually open instantaneously, by introducing two special matching and contacting surfaces on the movable seal piston and the primary piston chamber to restrain gas flow communicating with gas inlet when the pilot piston starts to open.

It is also an object of the present invention to avoid the difficulty in determining the ratio of gas flow in and out of the chambers proximate the pilot piston for opening and closing the valve.

It is also an object of the present invention to provide a solenoid isolation valve in which the stroke of primary piston is not limited by the stroke of the pilot piston, by introducing an axial center column mounted in the housing of the valve.

In keeping with these objects and with others which will become apparent hereinafter, one feature of present invention resides, briefly stated in a solenoid isolation valve which has a housing defining a primary piston chamber and an outlet chamber. Both chambers are in gas communication with a primary channel. Both chambers also are in gas communication with a gas inlet and a gas outlet respectively. An axial center column is in the primary piston chamber to provide the bleed seal seat, the axial passage, the vent holes, and the slide able support of both the seal piston and the primary piston. A tubular sleeve assembly with a magnetic closure at one end and connects to the hollow cylindrical flange provides the room for the slide of the pilot piston, the seal piston and the primary piston. The primary piston is received in the seal piston, and both move axially in the empty space of the flange. A special outer surface is designed at the open side of the seal piston being in perfect contact with the inner surface of the housing, to restrain the gas flow from the inlet to create a pressure difference between the front side and the of the back side of the primary piston. The valve opens instantly.

When the gas fills into the empty valve, the seal piston moves up slightly to allow gas flow into the chambers of valve, providing an equalization of pressures in chambers and sealing the valve and spring force resumes the seal piston to a closed position. When the solenoid is energized, pilot piston is moved to open the bleed orifice. The seal piston restrains the gas flow to decrease the gas pressure in the chambers, so that an instant opening of the valve to a wide-open position is ensured. While the valve is opened, the bleed orifice drains gas faster than in-flow in via the channel hole provided in the flange, to maintain the same pressure difference, so that the valve stays open. When the solenoid is de-energized, as the pilot piston adjusts itself to close the bleed orifice, there will be enough supply of gas via the channel hole to build up the gas pressure to close the valve.

The novel features which are considered as characteristics for the present invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
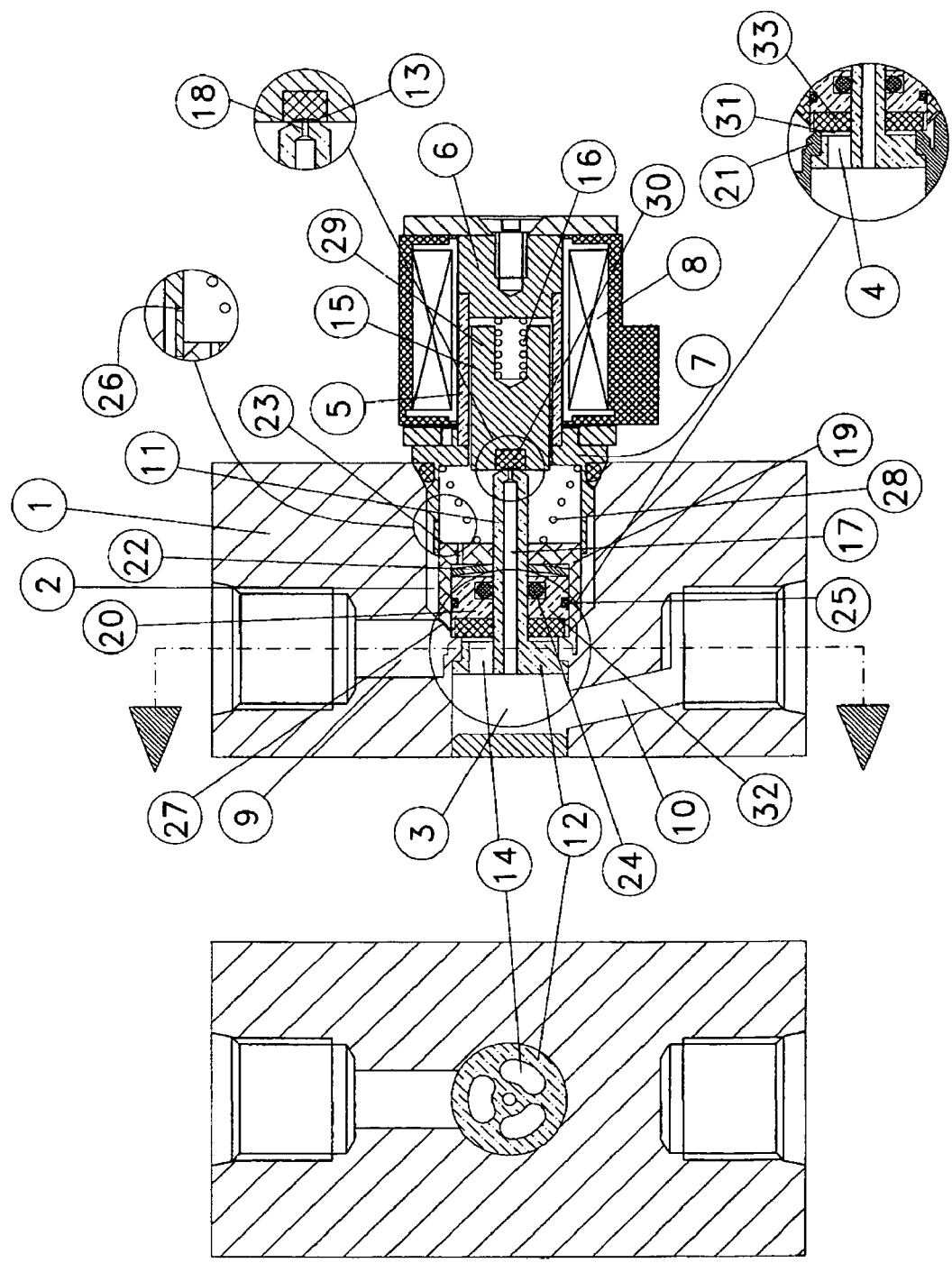
FIG. 1 is a cross-sectional view of a solenoid isolation valve of configuration 1 at closed state.

Attention is first directed to FIG. 1, which shows a solenoid isolation valve in section view. In housing 1, it provides the primary piston chamber 2 and the outlet chamber 3; both chambers are in gas communication with each other through the primary channel 4. The primary piston chamber 2 connects to the gas inlet 9. The outlet chamber 3 connects the gas outlet 10.

A non-magnetic tubular sleeve 5 with a magnetic closure 6 at one end connects to a magnetic hollow cylindrical flange 7. An electrical coil 8 around the tubular sleeve 5 for generating the magnetic field.

An axial center column 11 with a circular disk 12 at one end, and a bleed hole seat 13 at another end. There are vent holes 14 through the circular disk 12, parallel to the axis of the axial center column 11. The axial center column 11 mounts into the primary channel 4 with external threads on the circular disk 12. The column portion of the axial center column 11 sits in the primary piston chamber 2. Then, the primary piston chamber 2 is in gas communication with the outlet chamber 3 through the vent holes 14 of the circular disk 12.

A pilot piston 15 is received and axially movable within the tubular sleeve 5. The pilot piston 15 has a sufficiently loose fit within the tubular sleeve 5, to allow gas from one end of the pilot piston 15 to reach the other end. The pilot piston 15 is comprised of a magnetic pilot piston body 29 and a pilot seal 30 mounted at the end of piston body 29 to achieve a gas-tight seal against the bleed hole seat 13. The pilot seal 30 is made of soft rubber. A compression spring 16 urges the pilot piston 15 away from the magnetic closure 6 against the bleed hole seat 13 of the axial center column 11 towards the pilot piston closed position. An axial passage 17 within the axial center column 11 connects to a bleed orifice 18, close to the bleed hole seat 13. The axial passage 17 communicates remote from chambers proximate the pilot piston 15 with the outlet chamber 3.

A bowl-like seal piston 19 has a front side and a back side. The seal piston 19 is open at the front side, and a primary piston 20 is received within the seal piston 19. Both the primary piston 20 and the seal piston 19 are axially movable within the hollow cylindrical flange 7, and also slide able along the axial center column 11. Since the bowl-like seal piston 19 is made of soft plastic, having a close fit within the hollow cylindrical flange 7, it restrains the passage of gas axially between the seal piston 19 and the hollow cylindrical flange 7, when the seal piston 19 moves axially within the flange 7. A conical compression spring 28 urges the bowl-like seal piston 19 and the primary piston 20 towards the closed position.

A primary seal seat 21 and a primary orifice 31 locate at the boundary between the primary piston chamber 2 and the primary channel 4. A curved spring washer 22 locates in a chamber between the bowl-like seal piston 19 and the primary piston 20, urging the primary piston 20 towards the closed position. The primary piston 20 is comprised of the primary piston body 32 and a primary seal 33 mounted at the end of the front side of the primary piston 20. The primary seal 33 is made of plastic. The primary piston 20 operates an opened and a closed position within the bowl-like seal piston 19. The primary piston 20 has a front side and a back side. The back side is near the chamber between the seal piston 19 and the primary piston 20. When the primary piston 20 is at the closed position, it stops gas flow from the primary piston chamber 2 to the vent holes 14 of the circular disk 12 through the primary orifice 31. The seal piston 19 and the primary piston 20 are collectively known as primary piston assembly.

A bowl channel hole 23 is at the bottom side of the bowl-like seal piston 19, communicating the gas between the empty space of the hollow cylindrical flange 7 and the chamber in between the seal piston 19 and the primary piston 20. A primary peripheral seal 24 locates between the primary piston 20 and the axial center column 11, acting to restrain the passage of gas axially between the primary piston 20 and the axial center column 11. The primary peripheral seal 24 is achieved by an o-ring element located in a circumferential recess in an inner cylindrical portion of the primary piston body 32. The secondary peripheral seal 25 locates between the primary piston 20 and the bowl-like seal piston 19, acting to restrain the passage of gas axially between the seal piston 19 and the primary piston 20. The secondary peripheral seal 25 is achieved by an o-ring element located in a circumferential recess in an outer cylindrical portion of the primary piston body 32.

A channel hole 26, located in the cylindrical portion of the hollow cylindrical flange 7, perpendicular to the central axis of the flange 7. It communicates gas into the empty space of the flange 7. The outer surface 27 of the bowl-like seal piston 19, located at the front end, and the inner surface of the primary piston chamber 2 are in perfect contact with each other so that initially the gap between two surfaces restrains gas from the gas inlet 9 to the primary piston chamber 2 when the electrical coil 8 is not activated.

Referring to the FIG. 1, initially, the inlet gas pressurizes the valve. The pressured gas pushes up the bowl-like seal piston 19 to fill all empty chambers in the valve. The gas pressure in the valve is then in equilibrium. The two compression springs 16, 28 and the spring washer 22 push the pilot piston 15, the seal piston 19 and the primary piston 20 toward the closed position.

Figure 2:
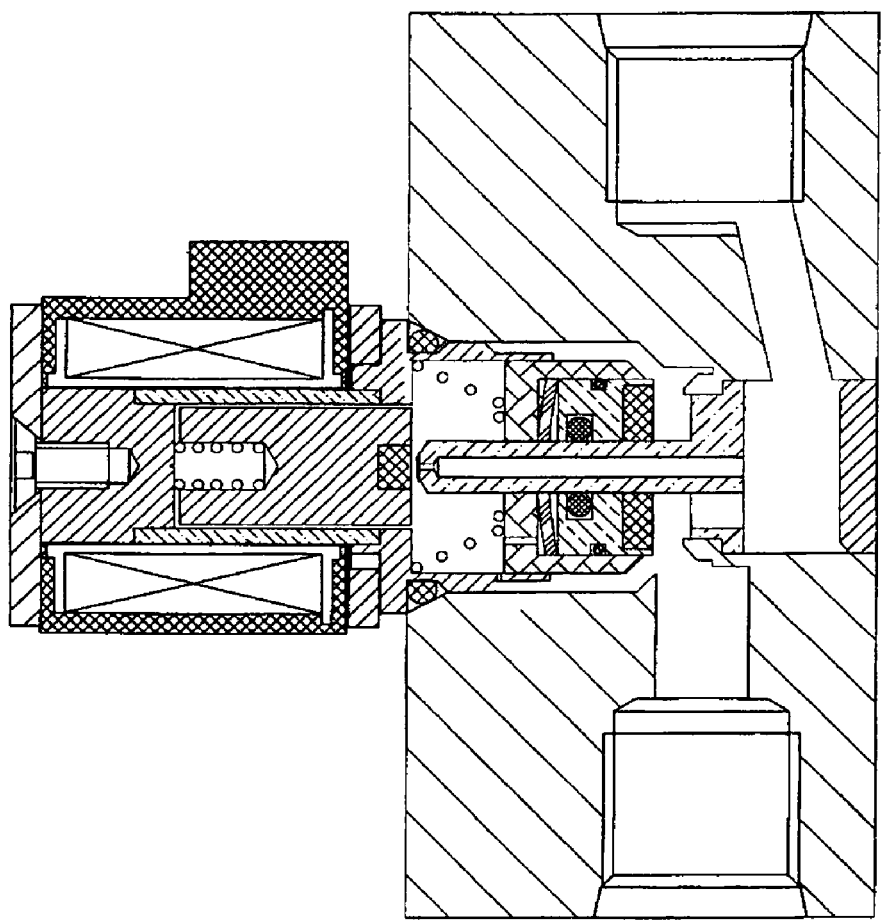
FIG. 2 is a cross-sectional view of a solenoid isolation valve of configuration 1 at opened state.

Referring to the FIG. 2, when the electrical coil 8 generates a magnetic field, the pilot piston 15 moves towards the closure. The gas reserved in the chambers of the valve is released to the outlet chamber 3 via the axial passage 17 and vent holes 14 of the axial center column 11, and the gas in the chambers of the valve drains instantly. It reduces the pressure in the chambers, the pressure difference overcomes the spring forces exerted by items 28 and 22, then, both the seal piston 19 and the primary piston 20 open to allow the gas inlet 9 communicate directly with outlet chamber 3. Since the size of the channel hole 26 is smaller than that of the bleed orifice 18, the gas pressure is not able to build up in the chambers in valve during the valve open operation because the amount of gas exiting the chambers is more than entering. The valve keeps open.

When the magnetic field ceases, the compression spring 16 pushes the pilot piston 15 to the sealed position. During the sealing procedure, the gas via the channel hole 26 and can supply enough gas to build up the gas pressure in the chambers near the pilot piston 15. The pilot piston 15 adjusts itself to seal the bleed orifice 18 completely. The gas pressure builds up and is in equilibrium in the chambers of the valve. All compression springs 16, 23 and spring washer 22 push the primary piston 20 towards the closed position.

Figure 3:
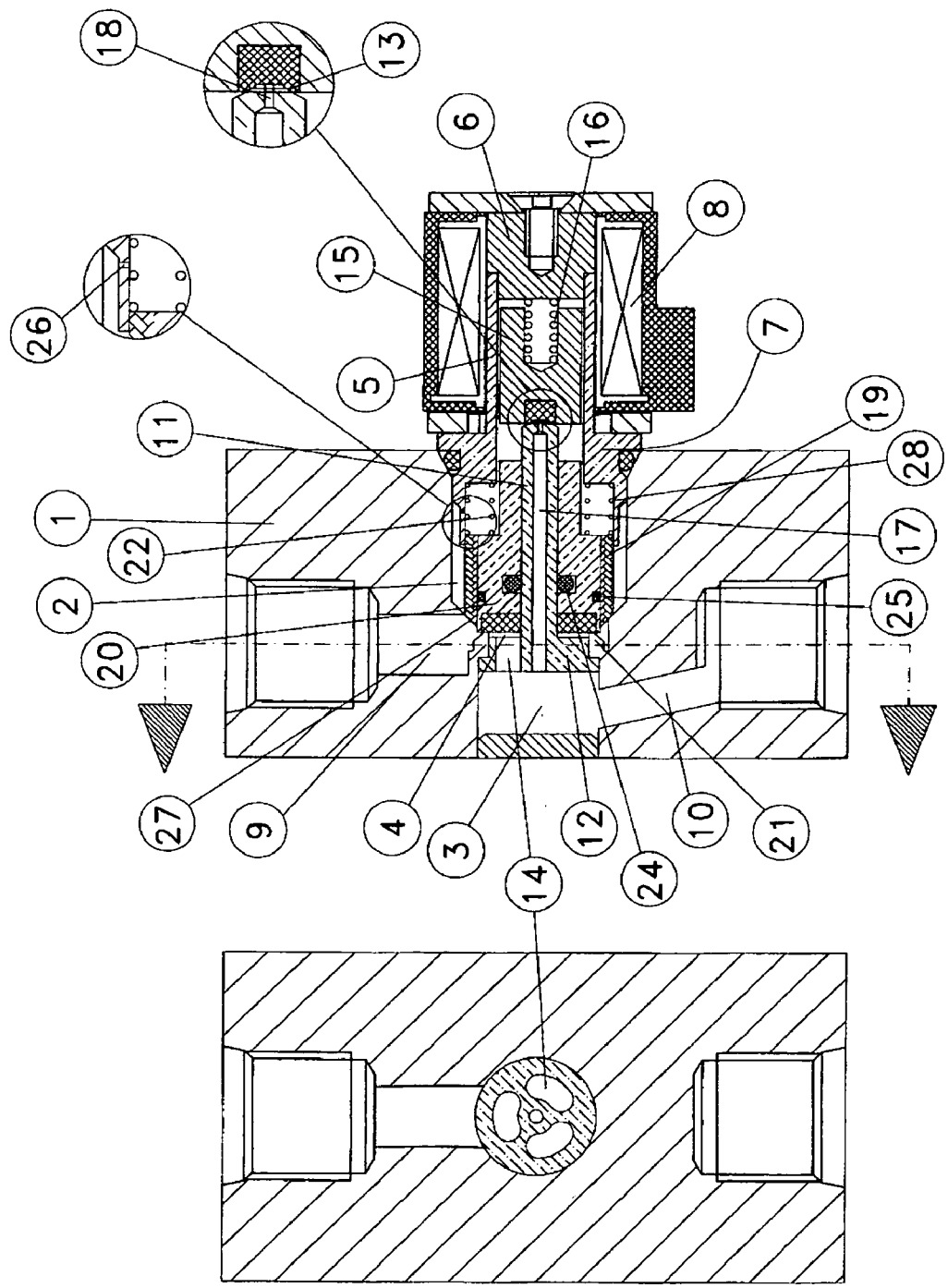
FIG. 3 is a cross-sectional view of a solenoid isolation valve of configuration 2 at closed state.

Attention is also directed to FIG. 3, which shows another kind of configuration of a solenoid isolation valve in section view. In this configuration, the seal piston 19 is a hollow cylinder, and a primary piston 20 is received in the seal piston. The compression springs 22 pushes the seal piston 19 and the compression 22 pushes the primary piston 20 towards the closed position respectively. The method of operation procedure is similar to the above-mentioned for FIGS. 1 and 2.

It will be understood that each of the elements described above, or two or more together, may also find a useful application in the other types of constructions differing from the types described above.

While the invention has been illustrated and described as embodied in solenoid isolation valve, it is not intended to be limited to the detail shown, since various modifications and structural changes may be made without departing in any way from the spirit of the present invention.

What is claimed is:

1. A valve for controlling the flow of gas from a source of gas to a demand, said valve comprising:
    a housing defining an axis, a primary piston chamber through which the axis extends and a gas inlet, the gas inlet being coupled in use to said source;
    a disk arranged in sealed relation with said housing and defining a vent extending from said primary piston chamber, the vent extending, in use, to said demand;
    a column projecting axially from said disk into said primary piston chamber and having an interior passage having one end, in use, in communication with said demand and another end terminating in a bleed orifice, the column having a bleed hole seat surrounding the bleed orifice;
    a tubular sleeve having at one end a closure preventing the escape of gas, the other end being sealingly coupled to the housing such that the interior of the sleeve is in fluid communication with the primary piston chamber;
    a pilot piston received and movable within the sleeve, the pilot piston having a sufficiently loose fit within the sleeve to allow gas from one end of the pilot piston to reach the other end thereof;
    a pilot biasing element urging the pilot piston against the bleed hole seat to seal the bleed orifice;
    a coil for selectively creating a magnetic field to urge the pilot piston away from the bleed hole seat;
    a seal piston operatively mounted to said column for axial movement within the primary piston chamber between a closed position and an open position, said seal piston having an interior and further having an outer surface, the outer surface sealing against an inner surface of the housing defining part of the primary piston chamber when the seal piston is at the closed position;
    a primary biasing element urging the seal piston towards the closed position;
    a primary piston received in sealing relation within the interior of the seal piston and slideable in sealing relation along said column for axial movement within the seal piston between a closed position and an open position; and
    a spring disposed between the primary piston and the seal piston for urging the primary piston towards the closed position
    wherein:
        when the primary piston and the seal piston are each at their respective closed positions, they isolate the gas inlet from the primary piston chamber;
        when the seal piston and primary piston are away from their closed positions, the gas inlet is in communication with the primary piston chamber and the vent communicates with the primary piston chamber;
        a bowl channel hole provides for gas communication between the primary piston chamber and a portion of the interior of the seal piston captured by the primary piston;
        a channel hole provides for gas communication between the primary piston chamber and the inlet when the seal piston is not at the closed position;
        when the coil is not generating a magnetic field and the source is coupled to the inlet, the gas pressure at the inlet causes the seal piston to initially move away from the closed position, leaving the primary piston at the closed position to seal the vent, said movement of the seal piston away from the closed position allowing gas from the inlet to enter the primary piston chamber until the gas pressure has equilibrated whereupon the primary biasing element returns the seal piston to its closed position;
        after the gas pressure has equilibrated and the seal has returned to its closed position, subsequent generation of a magnetic field by the coil caused the pilot piston to unseat from the bleed hole seat, whereupon the instantaneous pressure differentials in the valve cause the primary piston and the seal position to move towards their respective open positions, the gas pressures in the valve thereafter equilibrating such that pressure differentials in the valve overcome the primary biasing element and the spring and the valve remains open to permit communication between the inlet and the demand via the vent; and
        when the valve is open and the coil ceases generating a magnetic field, the pilot piston seals against the bleed hole seat, whereupon pressure differentials across the valve, in combination with the spring and primary biasing element cause the seal piston and primary piston to revert to their closed positions and restrain flow through the valve.

2. A valve according to claim 1, further comprising:
    a hollow ferromagnetic flange mounted in the primary piston chamber, orientated co-axial to the axis, in which the seal piston reciprocates and from which the sleeve extends;
    wherein
        the housing further defines an outlet chamber which communicates with the primary piston chamber via the vent;
        the sleeve is non-ferromagnetic;
        the closure is ferromagnetic;
        the closure, the coil, the ferromagnetic flange and the pilot piston together form a solenoid;
        the ferromagnetic flange defines the channel hole; and
        the seat piston is made of soft plastic.

3. A valve according to claim 2, wherein the pilot piston is movable within the sleeve parallel to the axis.

4. A valve according to claim 2, wherein the pilot piston includes a pilot seal which seals the bleed hole when the pilot piston is at the closed position, the pilot seal being made of an elastomer.

5. A valve according to claim 2, wherein the primary piston includes:
    a primary piston body having a circumferential recess and an end;
    a plastic primary seal mounted at the end of the primary piston body which seating engages the disk to occlude the vent when the primary piston is at its closed position; and
    an o-ring element disposed in said circumferential recess and defining a primary peripheral seal between the primary piston and the seal piston.

6. A valve according to claim 2, wherein the pilot biasing element is a compression spring.

7. A valve according to claim 2, wherein the primary biasing element is a compression spring and the spring is a spring washer.

8. A valve according to claim 2, wherein the outer surface of the seal piston is a tapered annular surface.

* * * * *